United States Patent [19]

Furuhashi et al.

[11] Patent Number: 5,233,619
[45] Date of Patent: Aug. 3, 1993

[54] HIGH POWER LIGHT PULSE GENERATOR

[75] Inventors: Masaaki Furuhashi; Ryoji Handa, both of Tokyo, Japan

[73] Assignee: Ando Electric Co., Ltd., Tokyo, Japan

[21] Appl. No.: 938,069

[22] Filed: Aug. 31, 1992

[30] Foreign Application Priority Data

Sep. 6, 1991 [JP] Japan ................... 3-254314

[51] Int. Cl.$^5$ ................................................ H01S 3/30
[52] U.S. Cl. .............................................. 372/6; 372/25
[58] Field of Search ....................... 372/6, 25, 30, 94

[56] References Cited

U.S. PATENT DOCUMENTS

| | | | |
|---|---|---|---|
| 4,685,107 | 8/1987 | Kafka et al. | 372/6 |
| 5,005,175 | 4/1991 | Desurvire et al. | 372/6 |
| 5,058,974 | 10/1991 | Mollenauer | 372/6 |

Primary Examiner—John D. Lee
Assistant Examiner—Robert E. Wise
Attorney, Agent, or Firm—Sprung Horn Kramer & Woods

[57] ABSTRACT

A high power light pulse generator apparatus using an optical loop formed through a rare earth-containing optical fiber. In the optical loop, selected one of a plurality of optical fiber cords having different lengths is inserted to change the overall length of the optical loop and thus a light pulse of different pulse width is withdrawn from loop.

3 Claims, 2 Drawing Sheets

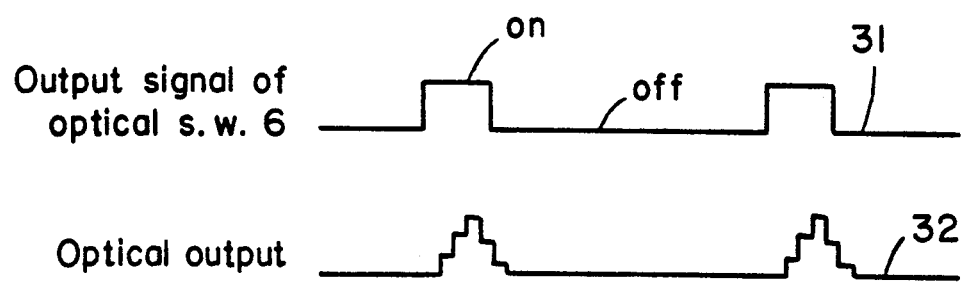
F I G. 3
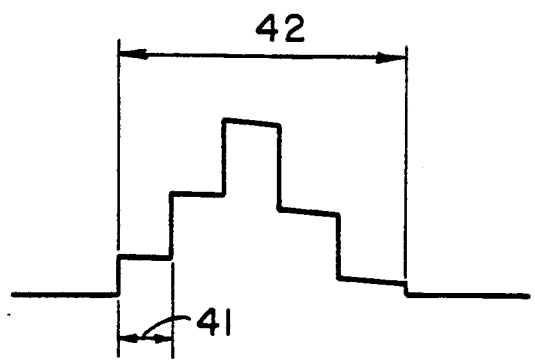
F I G. 4

HIGH POWER LIGHT PULSE GENERATOR

BACKGROUND OF THE INVENTION

1. Field of the invention

The present invention relates to a light pulse generator apparatus and more particular to a light pulse generator apparatus capable of generating a high power light pulse with a varying width.

2. Description of the prior art

A structure of a light pulse generating apparatus is proposed by the applicant in copending U.S. patent application Ser. No. 910,198 filed on Jul. 8, 1992, claiming the priority of Japanese Patent Application No. 3-197337 filed on Jul. 12, 1991, which is shown in FIG. 2 of this application. In this figure, a reference numeral 1 denotes an optical fiber, 2 denotes a light source for optical pumping, 3 denotes an optical coupler, 7 denotes an optical isolator, 5 denotes an optical switch, 6 denotes an optical switch controller, and 4 is an optical decoupler. The optical fiber is doped with a rare earth element and is optically pumped with the optical pumping light source 2. The output of the light source is supplied to the input terminal 3A of the coupler 3 to lead the output of the light source 2 to the optical fiber 1 by way of the optical isolator 7. The output of the optical fiber 1 is inputted to the optical switch 5. The optical switch controller 6 makes the optical switch 5 close to pass the light to the optical decoupler 4. An optical loop is formed in the apparatus shown in FIG. 2 by the optical coupler 3, the optical isolator 7, the optical fiber 1, the optical switch 5, the optical decoupler 6 and its output terminal 4A connected to the input terminal 3B of the optical coupler 3. A high power light pulse is generated in this loop by closing the optical switch 5 for a short period of time, and the light pulse is withdrawn from the output terminal 4B of the optical decoupler.

3. Problem to be solved

With this prior apparatus, the width of the light pulse can be changed by controlling the length of the time period of the closure of the optical switch 5. However, with the increase in the time of closure of the optical switch a limit is reached where the pulse width is no longer broadened. In order to broaden the pulse width the optical fiber 1 must be replaced with another one doped with a rare earth element having different property and length.

Accordingly, an object of the present invention is to provide a high power light pulse generator capable of changing the light pulse width without replacing the rare earth element-doped optical fiber.

Summary of the invention

The present invention overcomes the prior art difficulty by a high power light pulse generator with variable pulse width, which comprises a light source for optical pumping, a first optical coupler having a first input terminal supplied with the output of the light source and a second input terminal, an optical isolator supplied with the output of the first optical coupler, an optical fiber connected to the output of the first optical coupler, a plurality of optical fiber cords of different lengths, a first optical switch for selectively connecting one of the optical fiber cords to the output terminal of said optical fiber, a second optical coupler having input terminals supplied with the output of the optical fiber cords, an optical decoupler having a first output terminal for the high power light pulse output and a second output terminal connected to the second input terminal of the first optical coupler, a second optical switch for connecting the optical fiber to the decoupler, an optical switch controller for controlling closure of the second switch.

An optical loop is formed by these elements beginning from the first optical coupler, the isolator, the optical fiber, the first optical switch, selected one of the optical cords, the second optical switch, the optical decoupler, the second output of the decoupler and back to the first optical coupler. Closure of the second optical switch for a short period of time actuates the generation of a high power light pulse. The pulse width of the light pulse can be changed by selecting one of the optical fiber cords to change the over all length of the optical loop and thus a light pulse of different pulse width is withdrawn from the first output terminal of the decoupler.

BRIEF EXPLANATION OF THE DRAWINGS

FIG. 3 illustrates wave forms of outputs of the second optical switch and of the light output; and FIG. 4 is an enlarged view of the wave form 32 in FIG. 3.

DETAILED DESCRIPTION OF THE INVENTION

A preferred embodiment of a high power light pulse according of the present invention will now be explained in making reference to FIGS. 1, 3, and 4.

Figure 1:
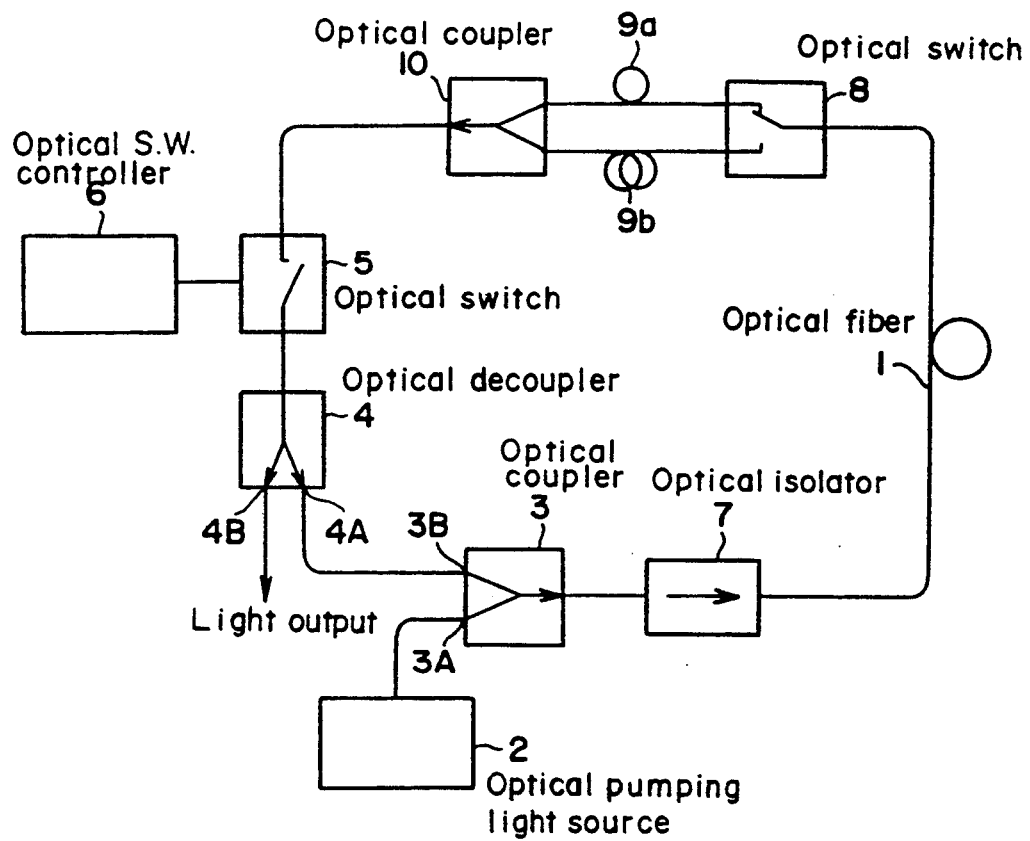
FIG. 1 illustrates a preferred embodiment of the high power light pulse generator.
Figure 2:
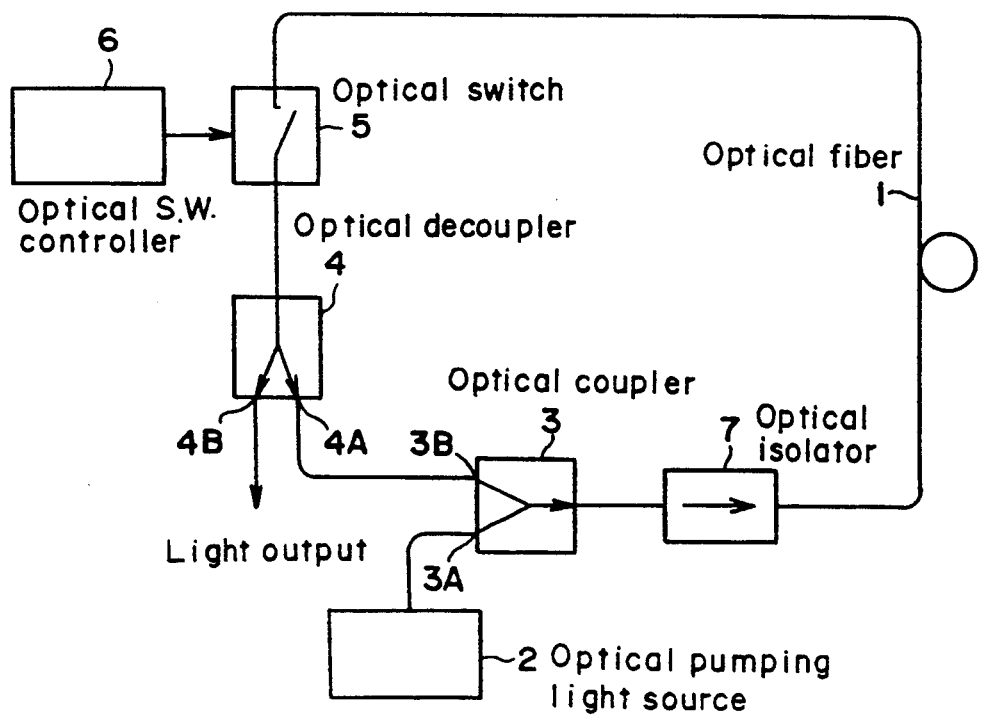
FIG. 2 illustrates a high power light pulse generator according to a copending prior application.

In FIG. 1, the high power light pulse generator apparatus includes a light source 2 for optical pumping, a first optical coupler 3 having a first input terminal 3A and a second input terminal 3B. The second input terminal 3B is required to form an optical loop as will be discussed later. The output of the optical pumping light source 2 is supplied to the first input terminal 3A. The output of the first optical coupler 3 is connected to an optical fiber 1 by an interposing isolator 7. A pair of optical fiber cords 9a and 9b of different lengths are selectively connected to the output end of the optical fiber 1 by a first optical switch 8. A second optical coupler 10 having input terminals connected to the output terminals of the the optical fiber cords 9a and 9b leads the light from them to a second optical switch 5, which is closed and opened by an optical switch controller 6. The second switch 5 connects the light from one of the optical fiber cords to an optical decoupler 4 having a first output terminal 4B for the high power light pulse output and a second output terminal 4A connected to the second input terminal 3B of the first optical coupler.

It is seen from FIG. 1 that an optical loop is formed by the first optical coupler 3, the isolator 7, the optical fiber 1, the first optical switch 8, selected one of the optical cords 9A and 9B, the second optical switch 5, the optical decoupler 4, the second output 4A of the decoupler 4 and the second input terminal 3B of the first optical coupler 3. Accordingly, when the second optical switch 5 is closed for a short period of time a high power light pulse is formed in the loop and then outputted to the second output terminal 4B of the decoupler 4.

The pulse width may be varied depending on the length of closure time of the second optical switch 5 but as discussed in the foregoing, there is a restriction. Accordingly, according to the present invention the first optical switch is actuated to change over the fiber cord from one to the other so as to change the overall length of the optical loop.

When the second optical switch 5 is closed for a short period of time while the optical fiber 1 is in pumping condition, the excited energy of the optical fiber 1 is positively fed back, thereby to generate a high oscillation power light output. FIG. 3 illustrates a wave form 31 of an output of the switch controller 6 as well as a wave form 32 of an output signal obtained at the first output terminal 4B of the optical decoupler 4. It is seen from this figure that optical switch 5 is closed when the level of the output of the controller is high and opened when the level of the output of the controller is low. The wave form 32 is an example of the light output which depends on the operation of the second optical switch 5. FIG. 5 is an enlarged view of a part of the wave form 32. The light power is stepwisely amplified through positive feedback to a peak and stepwisely decreased with the release of the light energy from the optical fiber 1. The duration 41 of each step is the time required for the light to travel through the entire one optical loop and by changing the loop length the pulse width 42 is changed.

By way of example, quartz glass fiber exhibits a light travelling time of about 5 ns per meter and if the length of the loop is changed by 20 m the duration 41 for each step is changed by 100 ns.

It should be noted that selection of more than two light pulse widths is made possible by increasing the number of poles of the first optical switch 8, the number of the optical fiber cords 9, and the input terminal of the optical coupler 10.

As is clear from the foregoing, according to the present invention, the high power light pulse width can be controlled by changing the length of the optical fiber cords without replacing the optical fiber with another one having a different property and/or of different length.

We claim:

1. A high power light pulse generator apparatus capable of generating a high power light pulse with a variable pulse width, which comprises a light source for optical pumping, a first optical coupler having a first input terminal supplied with the output of the light source and a second input terminal, an optical isolator supplied with the output of the first optical coupler, an optical fiber connected to the output of the first optical coupler, a plurality of optical fiber cords of different lengths, a first optical switch for selectively connecting one of the optical fiber cords to the output terminal of said optical fiber, a second optical coupler having input terminals supplied with the output of the optical fiber cords, an optical decoupler having a first output terminal for the high power light pulse output and a second output terminal connected to the second input terminal of the first optical coupler, a second optical switch for connecting the optical fiber to the decoupler, and an optical switch controller for controlling closure of the second switch.

2. A high power light pulse generator apparatus according to claim 1 wherein an optical loop extends from the first optical coupler, the isolator, the optical fiber, the first optical switch, selected one of the optical cords, the second optical switch, the optical decoupler, the second output of the decoupler and back to the first optical coupler whereby closure of the second optical switch for a short period of time actuates the generation of a high power light pulse.

3. A high power light pulse generator apparatus according to claim 1 wherein the first optical switch is operative to selectively connect one of the optical fiber cords to change the overall length of the optical loop and thus a light pulse of different pulse width is withdrawn from the first output terminal of the decoupler.

* * * * *